(12) United States Patent
Miller (10) Patent No.: US 7,136,084 B2
(45) Date of Patent: Nov. 14, 2006

(54) RANDOM LASER IMAGE PROJECTOR SYSTEM AND METHOD

(76) Inventor: Timothy J. Miller, 271 Forest Trail, Oviedo, FL (US) 32765

( * ) Notice: Subject to any disclaimer, the term of this patent is extended or adjusted under 35 U.S.C. 154(b) by 0 days.

(21) Appl. No.: 10/245,024

(22) Filed: Sep. 17, 2002

(65) Prior Publication Data

US 2004/0051777 A1 Mar. 18, 2004

(51) Int. Cl.
*B41J 2/47* (2006.01)
*B41J 27/00* (2006.01)

(52) U.S. Cl. ............... 347/225; 347/241; 347/256

(58) Field of Classification Search ........ 347/224–225, 347/231, 241–243, 256–260; 359/225, 202; 355/53; 396/561, 217; 219/121.68, 121.73, 219/121.25, 121.6, 121.74, 121.78, 121.8; 264/400; 250/230
See application file for complete search history.

(56) References Cited

U.S. PATENT DOCUMENTS

| | | | | |
|---|---|---|---|---|
| 3,182,574 | A * | 5/1965 | Fleisher et al. ............ | 396/561 |
| 3,549,733 | A * | 12/1970 | Caddell .................... | 264/400 |
| 4,116,534 | A * | 9/1978 | McMahon ................. | 359/225 |
| 4,707,711 | A * | 11/1987 | Hunter ...................... | 347/256 |
| 5,198,843 | A | 3/1993 | Ito et al. .................... | 347/256 |
| 5,309,273 | A * | 5/1994 | Mori et al. ................ | 359/202 |
| 5,414,239 | A * | 5/1995 | Terabayashi et al. .... | 219/121.73 |
| 5,438,354 | A | 8/1995 | Genovese .................. | 347/256 |
| 5,479,238 | A * | 12/1995 | Whitney ..................... | 355/53 |
| 5,521,628 | A | 5/1996 | Montgomery .............. | 347/243 |
| 6,528,758 | B1 * | 3/2003 | Shaffer ..................... | 219/121.68 |
| 6,816,294 | B1 * | 11/2004 | Unrath et al. ............. | 359/225 |

FOREIGN PATENT DOCUMENTS

| JP | 3118986 | 5/1991 |
|---|---|---|
| WO | WO 96/26039 | 8/1996 |

* cited by examiner

*Primary Examiner*—Hai Pham
(74) *Attorney, Agent, or Firm*—Foley & Lardner LLP (57) ABSTRACT

A laser projection system is disclosed. The laser projection system includes a laser light source that is configured to selectively provide laser light. The system also includes an input beam deflection unit receiving the laser light and configured to deflect the laser light. The input beam deflection unit is configured to selectively change the angle of deflection of the laser light. A selection lens is also a part of the laser projection system and is configured to refract the laser light. A mask having at least one aperture is used. The mask receives the refracted laser light from the selection lens. A selected area of the mask is selectively illuminated by the refracted laser light. Further, a collection lens receives at least a portion of the laser light from the at least one aperture and refracts the portion of laser light. Further still, the laser projection system includes a redirection unit that receives the refracted portion of the laser light from the collection lens and the redirection unit deflects the portion of the laser light to a target.

24 Claims, 5 Drawing Sheets

RANDOM LASER IMAGE PROJECTOR SYSTEM AND METHOD

BACKGROUND

The disclosure relates to laser imaging projectors and laser marking systems. More particularly, the disclosure relates to systems and methods for laser projection and marking using a laser beam selectively directed onto and through an aperture in a mask. More particularly still, the disclosure relates to the generation and projection of a randomly selected image along a single axial path.

Conventionally, laser light is projected onto the surface of a material to produce a two dimensional image for applications such as entertainment, printing, semiconductor manufacturing and tissue removal. Three basic techniques are employed to achieve these processes. They are mask generation, raster generation and vector generation. These three techniques are analogous to the differences in the printing industry between type setting, dot matrix printing, and XY plotting.

In type setting a selection of pre-fabricated relief dies, representing individual letters, are aligned in a printing fixture plate to form the desired text image. The dies on the plate are coated with ink and pressed onto the paper, forming the desired text with a single impact of the printing plate. This technique is typically used for high speed, high quality production of fixed images such as newspaper printing.

In a laser mask system, a laser image is projected onto a substrate material, such as paper, by passing the laser light through a mask or stencil having a cutout of the desired text image. The laser image impacts the material to be processed with pulses of laser light, creating the desired text image presented by the mask on the material. For example, the laser beam may cause a visual change to the surface impacted by means of vaporizing surface material (e.g. ink on paperboard), causing a surface change (e.g. glass) and/or causing chemical reaction to the surface material (e.g. some plastics). See FIG. 1.

A character generated by a conventional dot matrix printer is formed by a partially filled matrix of ink dots. A typical implementation contains five vertical columns by seven horizontal rows of dots. A print head for such a device may contain seven pins aligned in a vertical column. Selected pins from the column are engaged to strike a ribbon in front of the paper. This will deposit one column of selected ink dots on the paper, creating the first column of the character. The print head will move horizontally across the paper to the second column of the character and the process is repeated. After a series of five such strikes, the entire five by seven character is generated. Subsequent text is generated by repetition of the process.

Unlike type setting, the next character to be printed can be selected at random. This technique is generally used for medium speed printing of low-resolution images such as computer printouts.

In a conventional multiple laser system, several lasers are aligned to form a vertical column of laser dots. The selected lasers are fired simultaneously to create one vertical column of the image. As the product being processed moves horizontally relative to the lasers' position, sequential columns of laser pulses are generated to form the complete character or desired image. Similarly, a variety of single axis laser scanning systems produce the same effect by deflecting a single laser beam in a vertical axis, while turning the laser beam on and off to produce a vertical column of laser dots.

In a conventional XY plotter, an image or character is generated in a process very similar to handwriting. It positions a pen at the start of the image above the paper, then lowers the pen to the paper and moves the pen the two axis of the image plane, X and Y, to draw a segment of the image. The pen is next lifted off the paper and repositioned to the beginning of the next segment. Subsequent segments are sequentially generated in the same manner to form the entire image over time. This technique can produce type setting quality images with the dynamic image generation of dot matrix printing over a large area. It is typically used for low volume printing processes such as architectural plans.

In a conventional vector laser system, the laser beam can be positioned anywhere on a flat surface within the laser processing area and it can be moved in any desired direction within the X and Y axis of the processing area. In general, the laser is turned off during the positioning function and it is turned on during the controlled motion. These functions permit the sequential generation of the segments of images or characters, creating the entire image over time.

Some current masking systems include the disadvantage that they require high power lasers to illuminate the multiple characters of a mask. Further, the masks of other conventional systems require changing in order to provide for new characters or designs. In such systems, characters on a mask may not be selected at random or upon a command from a computer controlled system. Masks for a particular need must be developed in advance of usage. Masks tend to be a considerable expense in using conventional mask systems. In yet other conventional mask systems, masks may be used in which multiple characters may be included on the mask, in which case the mask must be moved (indexed) to select different characters. In such systems, the exit beam may be configured to exit the system along a single axial path. In yet still other conventional mask systems, the mask may have multiple characters or images and the beam may be moved to select the desired character or image. In such systems, the beam will not remain along a single axial path.

Accordingly, there is a need for a laser projection and/or marking system that may project at random selected characters and/or designs from a mask. Further, there is a need for a laser projection and/or marking system in which a mask does not need to be changed and/or moved (indexed) in order to provide different characters and/or designs. Further, there is a need for a laser projection and/or marking system that utilizes masks and requires lower powers than conventional mask systems. Further still, there is a need for a laser projection and/or marking system that is configured to select chosen characters and/or designs from a mask yet maintain an exit beam along a single axial path.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a laser projection system. The laser projection system includes a laser light source configured to selectively provide laser light. The laser projection system also includes an input beam deflection unit received in the laser light and configured to deflect the laser light. The input beam deflection unit is configured to selectively change the angle of deflection of the laser light.

Further, the laser projection system includes a selection lens configured to refract the laser light. Further still, the laser projection system includes a mask having at least one aperture. The mask receives the refracted laser light from the selection lens. A selected area of the mask is selectively illuminated by the refracted laser light. Yet further still, the laser projection system includes a collection lens receiving at least a portion of the laser light from the at least one aperture and refracting the portion of the laser light. Still yet further, the laser projection system includes a redirection unit receiving the refracted portion of the laser light from the collection lens and the redirection unit is configured to deflect the portion of the laser light.

Another exemplary embodiment relates to a method of marking a surface. The method includes providing a laser light source to an input beam deflection unit. The method also includes deflecting the laser light at a selected angle by the input beam deflection unit to a first lens. The input beam deflection unit has a changeable angle. The method further includes refracting the laser light by the first lens to a mask having more than one aperture. Further still, the method includes transmitting a portion of the laser light through at least one aperture in the mask and to a second lens. Yet further, the method includes refracting the portion of the laser light by the second lens to an output beam deflection unit. Yet further still, the method includes deflecting the portion of laser light to a target surface.

Further, another exemplary embodiment relates to a method of projecting a laser image. The method includes steering a laser beam to a selected region of a mask by selectively changing the angle of deflection of an incoming laser beam. The method also includes transmitting a portion of the laser beam through an aperture in the selected region of the mask. Further, the method includes steering the portion of the laser beam to a selected target.

Yet another exemplary embodiment relates to a laser image projection system. The laser image projection system includes a laser light source providing a laser beam. The laser image projection system also includes an input beam steering unit provided to steer the laser beam at selected angles. The laser image projection system also includes a mask having a plurality of apertures. The mask allows transmission of a portion of the laser beam. Yet further still, the laser image projection system includes an output beam steering unit provided to project the portion of the laser beam to a target.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
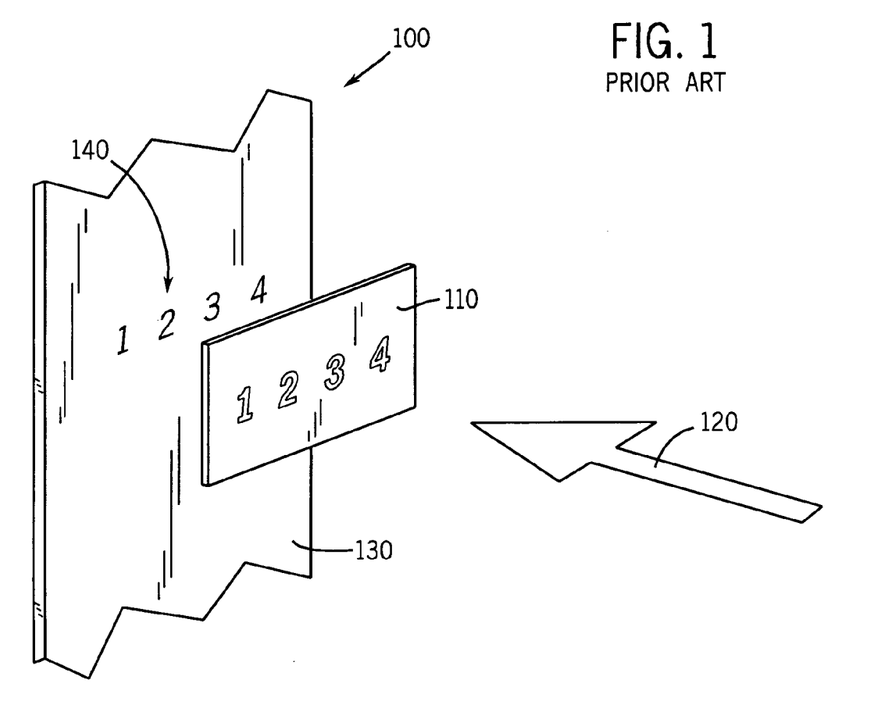
FIG. 1 is a diagrammatic representation of a laser marking mask system of the prior art.

Referring now to FIG. 1, a mask system 100 of the prior art is depicted. Mask system 100 includes a steel mask 110 having characters 1, 2, 3, 4 provided as apertures therein. Mask 100 is configured to block incoming laser light 120 from impacting product 130 except for light going through apertures 1, 2, 3, and 4 simultaneously, which are projected onto the surface of product 130 as characters 1, 2, 3, and 4 140. Characters 140 may be projected onto product 130 and further may change the surface characteristics of product 130 leaving a permanent mark of characters 140 on the surface of product 130. Mask system 100 does not allow a user to select at random or upon controlled command a single character from steel mask 110 to be projected onto the surface of product 130. Laser light 120 is configured to illuminate the entirety of mask 110. Because a large mask area must be illuminated, that is, the entire sequence of characters (1, 2, 3, 4) on mask 110, a higher power laser is required than would be required to illuminate a single character.

A Random Image Projector, RIP, in its most basic form operates in a fashion similar to a typewriter. In a typewriter a key representing a character is selected and depressed causing a corresponding die to strike an inked ribbon. The impact of the die on the ribbon creates the desired character by transferring the ink in the shape of the die to the paper beneath the ribbon. Keys are pressed sequentially and can be selected at random to create the desired words on the paper as the paper moves past the print position below the ribbon. Likewise in a random image projector a character may be individually selected from those on a mask, and the laser beam is directed through the single character or multiple characters selected.

Figure 2:
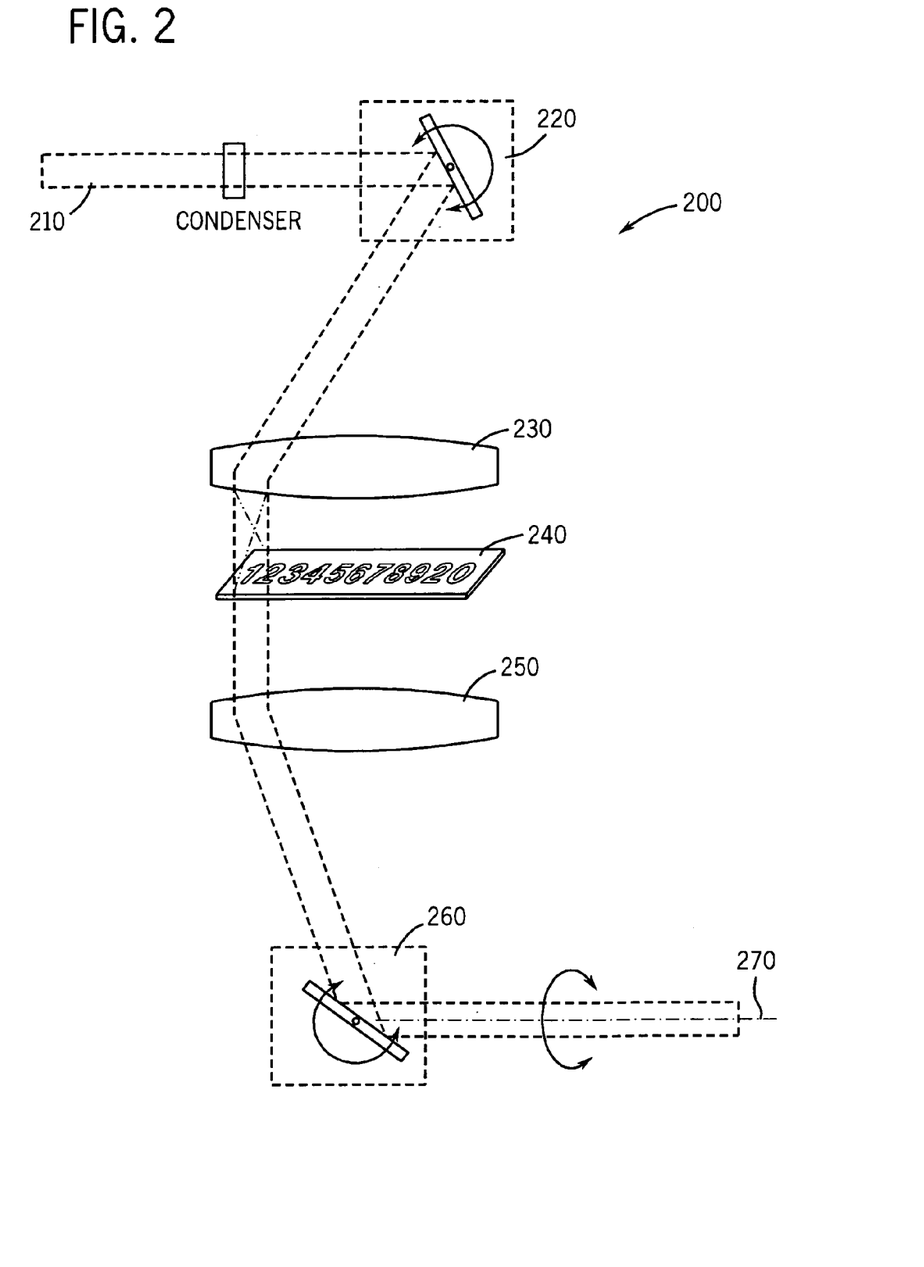
FIG. 2 is a diagrammatic representation of an exemplary embodiment of a random laser image projection system.

Referring now to FIG. 2, a RIP system 200 is depicted. Like the typewriter, RIP system 200 provides for the projection of a randomly selected laser image from a predefined collection of characters and/or designs on a laser mask. System 200 is configured to direct the selected image to a single point in space above a substrate material, similar to the typewriters' ribbon above the paper. This implementation generates images sequentially and relies on the movement of the substrate material to space the images, as does a typewriters' platen by moving the paper.

In an exemplary embodiment of system 200 six distinct apparatus are included; a laser beam 210, an input beam deflection unit 220, a selection lens 230, a laser mask 240, a collection lens 250, and an exit beam redirection unit 260. The exemplary embodiment of system 200 depicted in FIG. 2 is exemplary of a single axis configuration in which characters and/or designs are selected by relocation of the beam along the mask along a single axis.

In the depicted configuration of system 200, laser mask 240 consists of the decimal numbers 0–9. Mask 240 is made such that it transmits laser light 210 in the area of mask 240 forming the individual numbers, and reflects or absorbs laser light 210 in the area of mask 240 surrounding the number being illuminated. Input laser beam 210, when projected onto laser mask 240, is of a diameter large enough to completely cover any single number on mask 240 without overlapping the adjacent numbers (and/or characters).

Referring again to system 200, condensed laser beam 210 is directed along a single path into input beam redirection unit (IBRU) 220. Condensed laser beam 210 may be provided from any of a variety of laser light sources, including but not limited to, $CO_2$ lasers, YAG (Yttrium Aluminum Garnet) lasers, excimer lasers, and the like, providing light wavelengths in the range of approximately 200–10,600 nanometers (nm), or other wavelengths. Further, laser beam 210 may be supplied by lasers having any of a variety of powers including but not limited to 5 MW, or other powers. Because beam 210 is required to illuminate a smaller area than systems of the prior art, such as the exemplary embodiment depicted in FIG. 1, system 200 may require a beam 210 from a laser light source having substantially less power than that required for system 100, because energy density is proportional to the square of the area covered by beam 210 (in the case of a round beam 210). It should be noted that systems using different beam shapes may exhibit different power characteristics. The round beam case is provided merely for exemplary purposes and is not meant to be exhaustive. IBRU 220 redirects beam 210 through selection lens 230. In the exemplary embodiment depicted in FIG. 2, IBRU 220 consists of a mechanism for varying the angle of deflection about a single axis. IBRU 220 may be, but is not limited to a galvanometric electronically controlled deflection unit, but may also be acousto-optic devices, piezoelectric devices, or the like. IBRU 220 is configured to direct beam 210 through the center of selection lens 230 or at a range of angles to either side of center. In the exemplary embodiment depicted in FIG. 2, there is a single unique angle of exit from IBRU 220 corresponding to the position of character (aperture) on the mask. IBRU 220 is capable of high-speed random selection of the exit angle and can be computer controlled. For example, IBRU 220 may be capable of, but is not limited to, selection at a rate of 1 millisecond (ms) or less.

Laser beam 210 enters selection lens 230 at an angle defined by IBRU 220. Selection lens 220 is preferably telecentric in nature, causing all beams entering the lens through its range of input angles to exit the lens parallel to each other and perpendicular to laser mask 240. Further, selection lens 230 is preferably an f-theta type lens. Further still, it should be noted that selection lens 230 and collection lens 250 may be a collection of or set of lenses, which together perform the desired functions and have the desired optical characteristics. In the example depicted in FIG. 2, IBRU 220 has defined an entrance angle into selection lens 230 which causes laser beam 210 to exit selection lens 230 perpendicular to laser mask 240 and positioned on the mask to image only the aperture corresponding to the number "1".

A collection lens 250 performs the inverse function of selection lens 230. In the exemplary embodiment depicted, collection lens 250 is identical to selection lens 230 but it is placed in the laser beam 210 path such that laser beam 210 will pass through it in the opposite direction. All images selected from laser mask 240 will enter collection lens 250 parallel to each other and perpendicular to collection lens 250. Collection lens 250 is configured to change the angle of the incoming laser images causing all parallel incoming images to be projected to a single position behind the lens at the location of exit beam redirection unit 260.

Each position on laser mask 240 has a unique IBRU 220 angle, and there is a correlating unique entrance angle into the exit beam redirection unit (EBRU) 260 from the collection lens 250. EBRU 260 will correct the input angle of any laser image projected into it from collection lens 250 such that all images exiting EBRU 260 are along a single axial path 230. Accordingly, in an alternative embodiment, the beam exiting EBRU 260 may be used easily as an input to another optical device, such as but not limited to a projector. Further, because the image, no matter which character or design is selected from mask 240, always emerges from system 200 along axial path 270, the design of marking systems utilizing system 200 is simplified.

Figure 3:
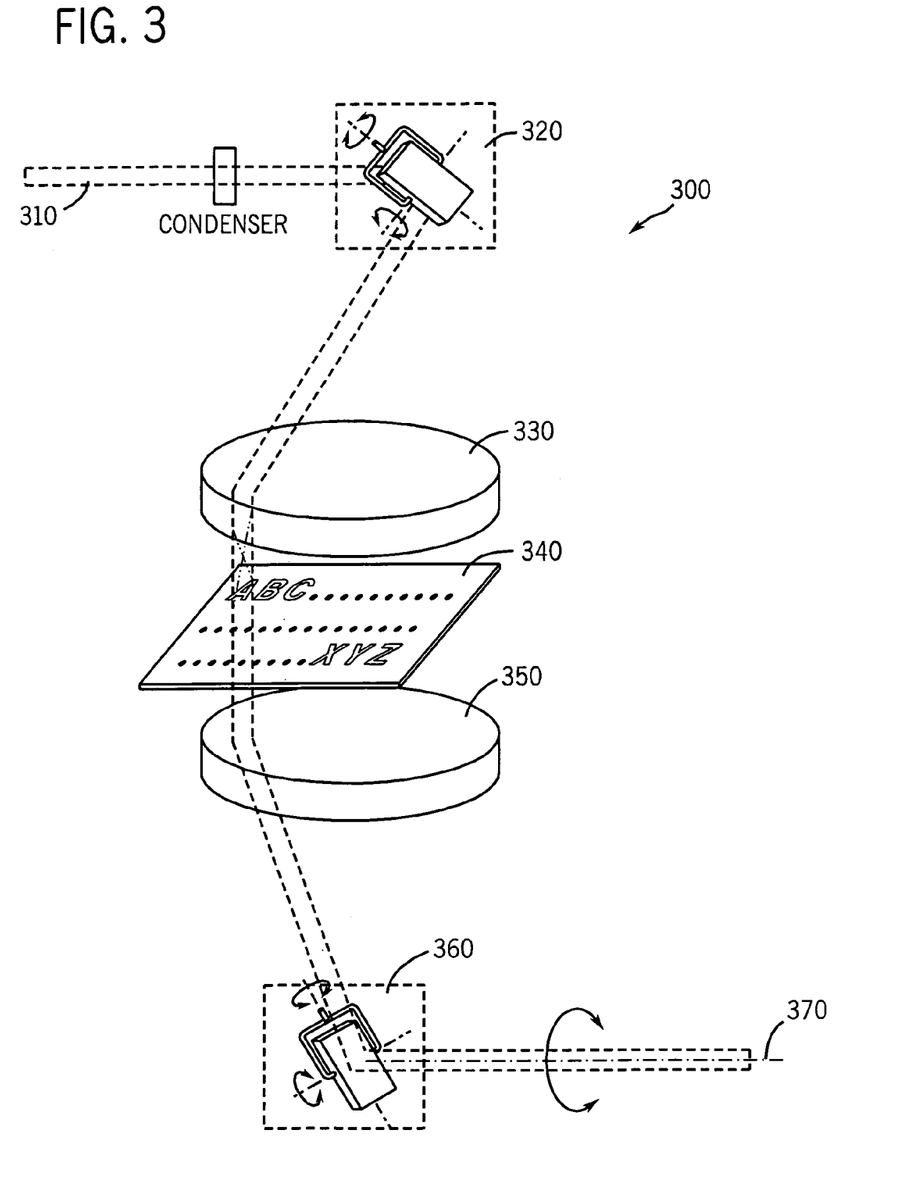
FIG. 3 is a diagrammatic representation of a random laser image projection system having a two-dimensional mask.

Referring now to FIG. 3, another exemplary embodiment of a laser projection and/or marking system 300 is depicted. System 300 is similar to system 200 depicted in FIG. 2 except that system 300 has been configured to use a two-dimensional mask 340. Two dimensional mask 340 includes an array of apertures configured in a planar mask surface. An input laser beam 310 is redirected in up to two orthogonal directions by a bi-directional IBRU 320. Accordingly, beam 310 may be redirected to be refracted onto mask 340 around any selected character (aperture) of mask 340, by a two-dimensional selection lens 330. Similar to system 200, system 300 may include a collection lens 350 which is an identical lens to lens 330 but is oriented in the reverse direction to provide the inverse result and direct beam 310 to a two-dimensional EBRU 360. EBRU 360 is computer controlled to direct beam 310 onto a target. It should be noted that similar to system 200, beam 310 of system 300 exits EBRU 360 along a single axial path 370. Accordingly, the image emerging from system 300 is always along axial path 370 regardless of which character is selected from mask 340.

In both systems 200 and 300, beam 210 and 310 respectively project a laser image of the mask aperture through which the beam is being directed onto the target. In a laser marking system, the surface of the target is changed mechanically and/or chemically producing a mark with the shape of the projected image. The projected image selected from the mask may be changed rapidly, on the order of 1 to 100 kiloHertz (kHz) to produce markings on a moving target such as on product packaging, which may be moving rapidly in a conveyored assembly line. For example systems 200 and 300 may be used to provide package markings, such as but not limited to "born on" dates or "best if used by" dates.

Figure 4:
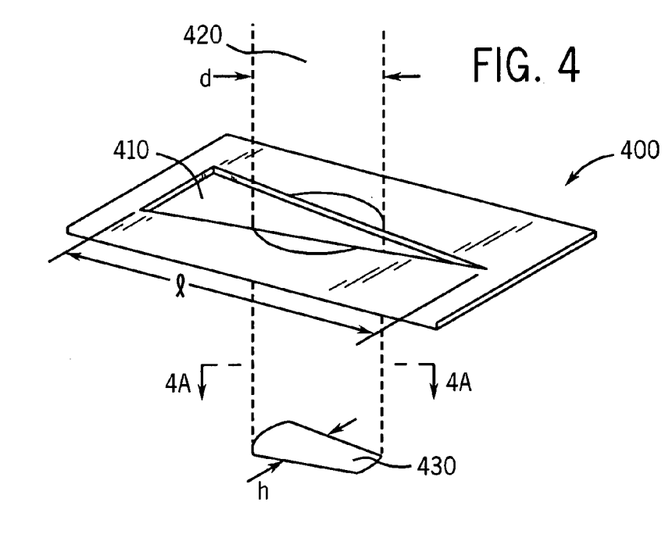
FIG. 4 is an exemplary representation of a laser mask in accordance with an alternative embodiment.
Figure 4A:
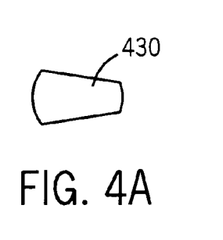
FIG. 4A is an exemplary representation of a projected shape using the laser mask of FIG. 4.

In another exemplary embodiment depicted in FIG. 4, an alternative type of mask 400 may be used with system 200 to provide for projections having varying heights "h". For example a single aperture 410 having a length "l" which is much greater than the diameter "d" of laser beam 420, may be used to create projected shapes 430 with varying height "h" (see, e.g. FIG. 4A). Mask 400 utilizes a "continuous" aperture in mask 400 as opposed to the discretized apertures in masks 240 and 340. Having a continuous mask would allow the selection of projections from a substantially continuous array of shapes along the aperture, limited only by the discretization of deflection angles of the IBRU. The shape of aperture 410 is not limited to the shape depicted in FIG. 4, but may be selected from an infinite number of shapes. Such a continuously selectable mask 400 may be used in any of a variety of marking or projection systems, including but not limited to photolithography systems and other marking systems.

Figures 5, 5A:
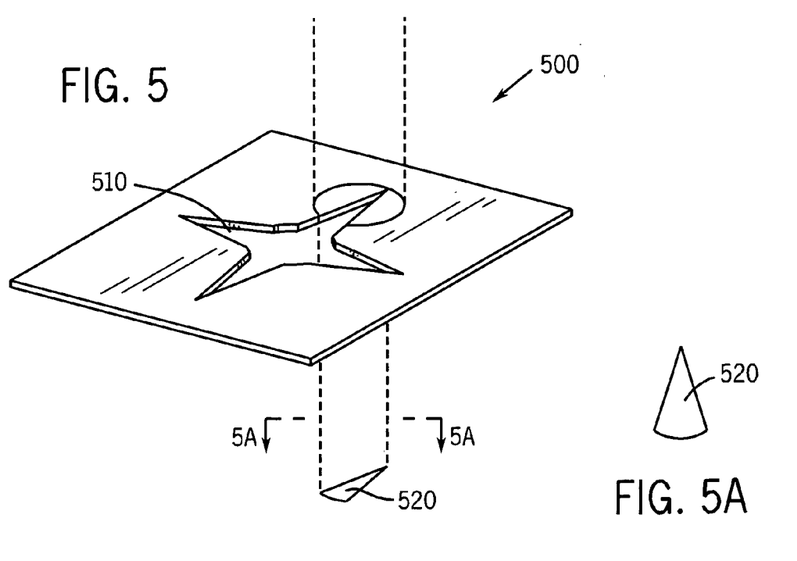
FIG. 5 is an exemplary representation of a laser mask in accordance with an alternative embodiment.
FIG. 5A is an exemplary representation of a projected shape using the laser mask of FIG. 5.

In a further alternative embodiment of a continuously selectable mask, an example of a two-dimensional mask 500 is depicted. Mask 500 includes an aperture 510 which is configured to provide a variety of user selectable and/or a programmed aggregate of selectable shapes (e.g. shape 520 depicted in FIGS. 5 and 5A) such that a system using mask 500 may provide a variety of shapes per the programmed design of a user.

Figure 6:
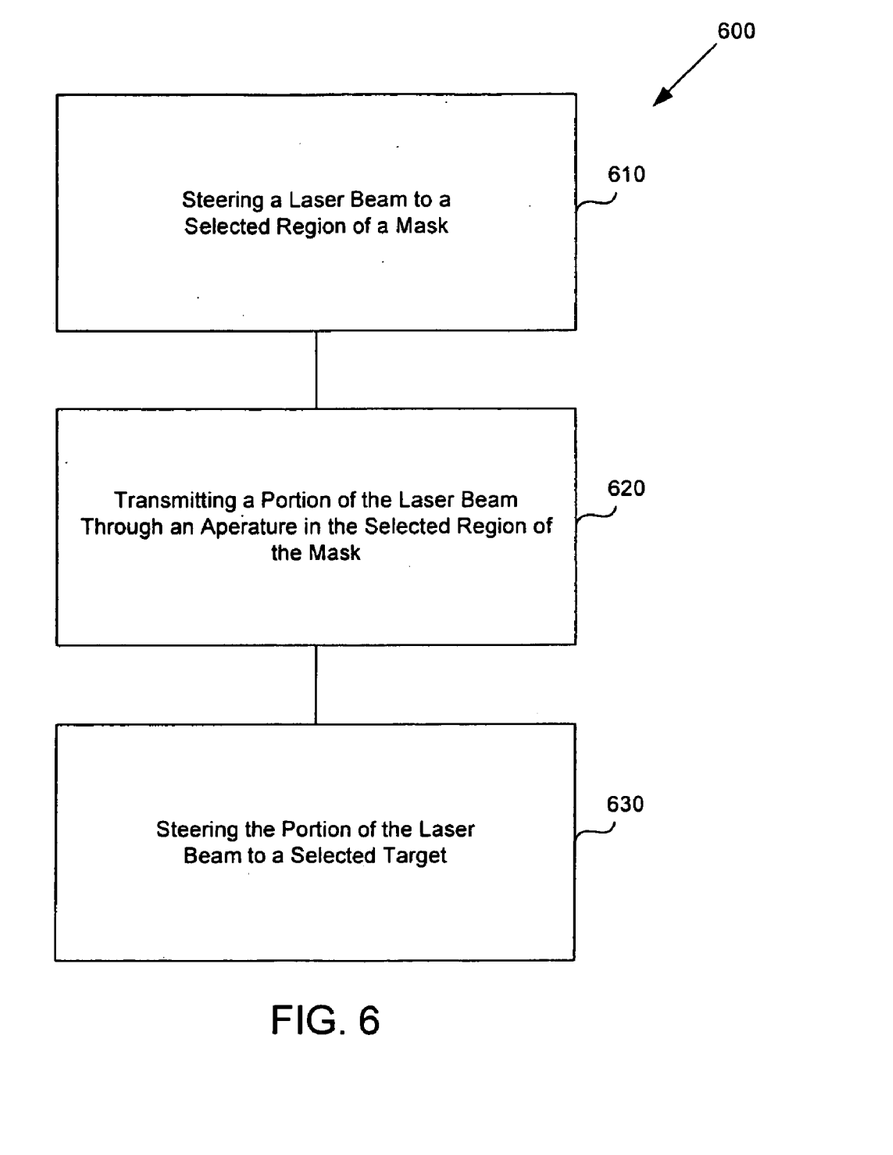
FIG. 6 is an exemplary process diagram representing a method of projecting a laser image.

Referring now to FIG. 6, a process diagram representing a method of projecting a randomly chosen character or design from a plurality of characters and/or designs of a laser mask is depicted. Process 600 includes providing a condensed laser beam to a mechanism for deflecting and/or steering the laser beam to a selected region of the mask. Preferably, the steering mechanism is computer controlled in an automated control system (step 610.) The method also includes transmitting a portion of the laser beam through an aperture in the selected region of the mask (step 620). The mask preferably includes a plurality of apertures, each aperture having a unique design, possibly representing an alpha numeric character. Alternatively, the condensed laser beam may be used to select a portion of the aperture to project a selected portion of a design. Finally, the method includes steering the portion of the laser beam that has proceeded through the aperture to a selected target (step 630). Steering of the laser beam is computer controlled and may be coordinated with both the movement of a target and, further, with the steering of the incoming laser beam in step 610.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A laser projection system comprising:
   a laser light source configured to selectively provide laser light having a diameter;
   a single input beam deflector receiving the laser light and configured to deflect the laser light, the single input beam deflector configured to selectively change the angle of deflection of the laser light, the single input beam deflector having two degrees of freedom of motion;
   a selection lens configured to refract the laser light;
   a mask having at least one aperture, the mask receiving the refracted laser light from the selection lens, a selected area of the aperture being selectively illuminated by the refracted laser light;
   a collection lens receiving at least a portion of the laser light from the at least one aperture and refracting the portion of the laser light;
   a single redirector, the single redirector having two degrees of freedom of motion, the single redirector receiving the refracted portion of the laser light from the collection lens and the single redirector being configured to deflect the portion of the laser light;
   wherein the aperture includes a length that is much greater than the diameter of the laser light to create projected shapes with a varying height depending on the selected area of the aperture being selectively illuminated by the refracted laser light.

2. The laser projection system of claim 1, wherein the laser light source includes a carbon dioxide ($CO_2$) laser.

3. The laser projection system of claim 1, wherein the mask includes apertures aligned along a single axis.

4. The laser projection system of claim 1, wherein the mask includes apertures distributed on a plane in two directions.

5. The laser projection system of claim 1, wherein the selection lens includes a telecentric lens.

6. The laser projection system of claim 1, wherein the selection lens includes an f-theta lens.

7. The laser projection system of claim 1, wherein the selection lens is a telecentric f-theta lens.

8. The laser projection system of claim 1, wherein the collection lens is the same type of lens as the selection lens.

9. The laser projection system of claim 8, wherein the collection lens and the selection lens are pointed in opposite directions.

10. The laser projection system of claim 1, wherein the single input beam deflector includes a galvanometric device.

11. The laser projection system of claim 1, wherein the single input beam deflector includes an acousto-optic device.

12. The laser projection system of claim 1, wherein the single input beam deflector includes a piezoelectric device.

13. The laser projection system of claim 1, wherein the mask includes an elongated aperture.

14. The laser projection system of claim 13, wherein the aperture is substantially triangular in shape.

15. A method of marking a surface, comprising:
    providing a laser light source to an input beam single deflector;
    deflecting the laser light at a selected angle by the input beam single deflector to a first lens, the input beam single deflector having changeable angles, the angles being changeable about two orthogonal axes;
    refracting the laser light by the first lens to a mask having a continuous, non-discrete aperture;
    transmitting a portion of the laser light through a portion of the continuous, non-discrete aperture in the mask and to a second lens;
    refracting the portion of the laser light by the second lens to an output beam deflector;
    deflecting the portion of the laser light to a target surface by using the output beam deflector which changes an angle of deflection about two orthogonal axes;
    providing a laser projection with varying heights on the target surface based on the portion area of the continuous, non-discrete aperture being selectively illuminated by the refracted laser light.

16. The method of claim 15, further comprising:
    condensing the laser light from the laser light source.

17. The method of claim 15, further comprising:
    changing the angle of deflection between pulses of the laser light source.

18. A method of projecting a laser image, comprising:
    providing a laser beam at a predetermined frequency;
    steering the laser beam to a selected region of a mask by selectively changing the angle of deflection of an incoming laser beam using a first beam deflector by rotating the first deflector about two orthogonal axes;
    transmitting a portion of the laser beam through a portion of an aperture in the selected region of the mask; and steering the portion of the laser beam to a selected target using a second beam deflector by rotating the second deflector about two orthogonal axes;

varying the height of the projected laser beam on the target surface by changing the portion of the aperture being selectively illuminated by the laser beam.

19. The method of claim 18, further comprising:

condensing laser light from a laser light source into a laser beam.

20. The method of claim 18, further comprising:

moving the target.

21. A laser image projection system, comprising:

a laser light source, providing a laser beam;

an input beam deflector, provided to steer the laser beam at selected angles by rotating the input beam deflector about two orthogonal axes;

a mask allowing transmission of a portion of the laser beam and having an aperture and a means for providing a selection of laser projections from a substantially continuous array of shapes along the aperture to vary the height of the projected laser beam; and an output beam deflector, provided to project the portion of the laser beam to a target by rotating the output beam deflector about two orthogonal axes.

22. The laser image projection system of claim 21, wherein the input beam deflector is commanded to steer the incoming laser beam between receiving laser beam pulses.

23. The laser image projection system of claim 22, wherein a predetermined portion of the mask is illuminated by the laser beam according to the command to the input beam deflector.

24. The laser image projection system of claim 21, further comprising a plurality of apertures, wherein the output beam deflector projects the portion of the laser beam along a single axial path regardless of the aperture selected from the plurality of apertures.

\* \* \* \* \*